(12) United States Patent
Shimura

(10) Patent No.: US 8,532,494 B2
(45) Date of Patent: Sep. 10, 2013

(54) OPTICAL BIDIRECTIONAL COMMUNICATION MODULE AND OPTICAL BIDIRECTIONAL COMMUNICATION APPARATUS

(75) Inventor: Daisuke Shimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 334 days.

(21) Appl. No.: 12/805,059

(22) Filed: Jul. 9, 2010

(65) Prior Publication Data

US 2011/0076025 A1  Mar. 31, 2011

(30) Foreign Application Priority Data

Sep. 29, 2009 (JP) ................................. 2009-224673

(51) Int. Cl.
*H04B 10/00* (2013.01)
*G02B 6/12* (2006.01)
*G02B 6/30* (2006.01)
*G02B 6/36* (2006.01)

(52) U.S. Cl.
USPC ................. 398/139; 385/14; 385/49; 385/89

(58) Field of Classification Search
USPC .......................................................... 398/139
See application file for complete search history.

(56) References Cited

U.S. PATENT DOCUMENTS

| 4,730,330 | A  | * | 3/1988  | Plihal et al. ............... 372/50.21 |
|-----------|----|---|---------|-----------------------------|
| 6,215,917 | B1 | * | 4/2001  | Takahashi et al. .............. 385/14 |
| 6,234,686 | B1 | * | 5/2001  | Tonai et al. ..................... 385/88 |
| 6,316,281 | B1 | * | 11/2001 | Lee et al. ......................... 438/31 |
| 7,773,836 | B2 | * | 8/2010  | De Dobbelaere ............... 385/14 |
| 2002/0067892 | A1 | * | 6/2002 | Oguro ............................ 385/49 |
| 2003/0161583 | A1 | * | 8/2003 | Kuhara .......................... 385/49 |
| 2004/0105611 | A1 | * | 6/2004 | Bischel et al. .................. 385/14 |

FOREIGN PATENT DOCUMENTS

| JP | 10-206678 A | 8/1998 |
| JP | 11-068705 A | 3/1999 |

* cited by examiner

*Primary Examiner* — Kenneth Vanderpuye
*Assistant Examiner* — Abbas H Alagheband
(74) *Attorney, Agent, or Firm* — Rabin & Berdo, P.C.

(57) ABSTRACT

An optical bidirectional communication module includes a light-emitting element, a light-receiving element and an optical waveguide. The optical waveguide performs wavelength division on light received from an optical fiber and guides the received light to the light-receiving element. The optical waveguide also performs wavelength division on light emitted from the light-emitting element and guides the emitted light to the optical fiber. The light-emitting element, the light-receiving element and the optical waveguide are incorporated on an optical substrate.

10 Claims, 7 Drawing Sheets

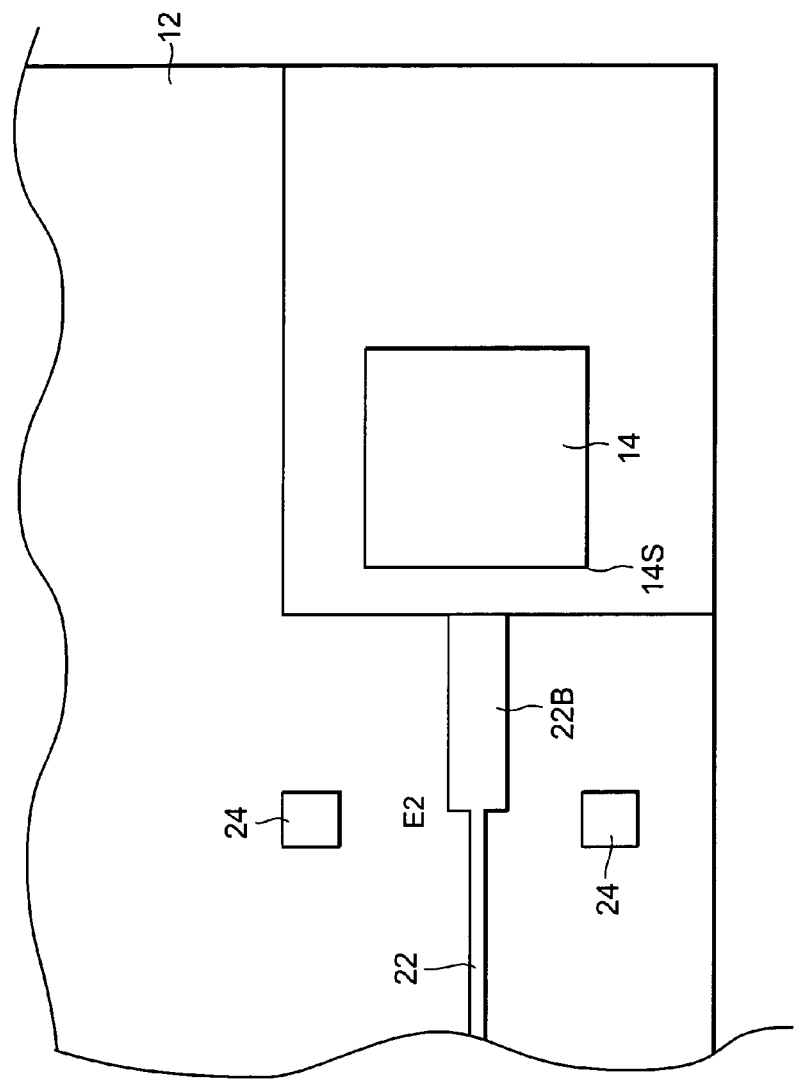

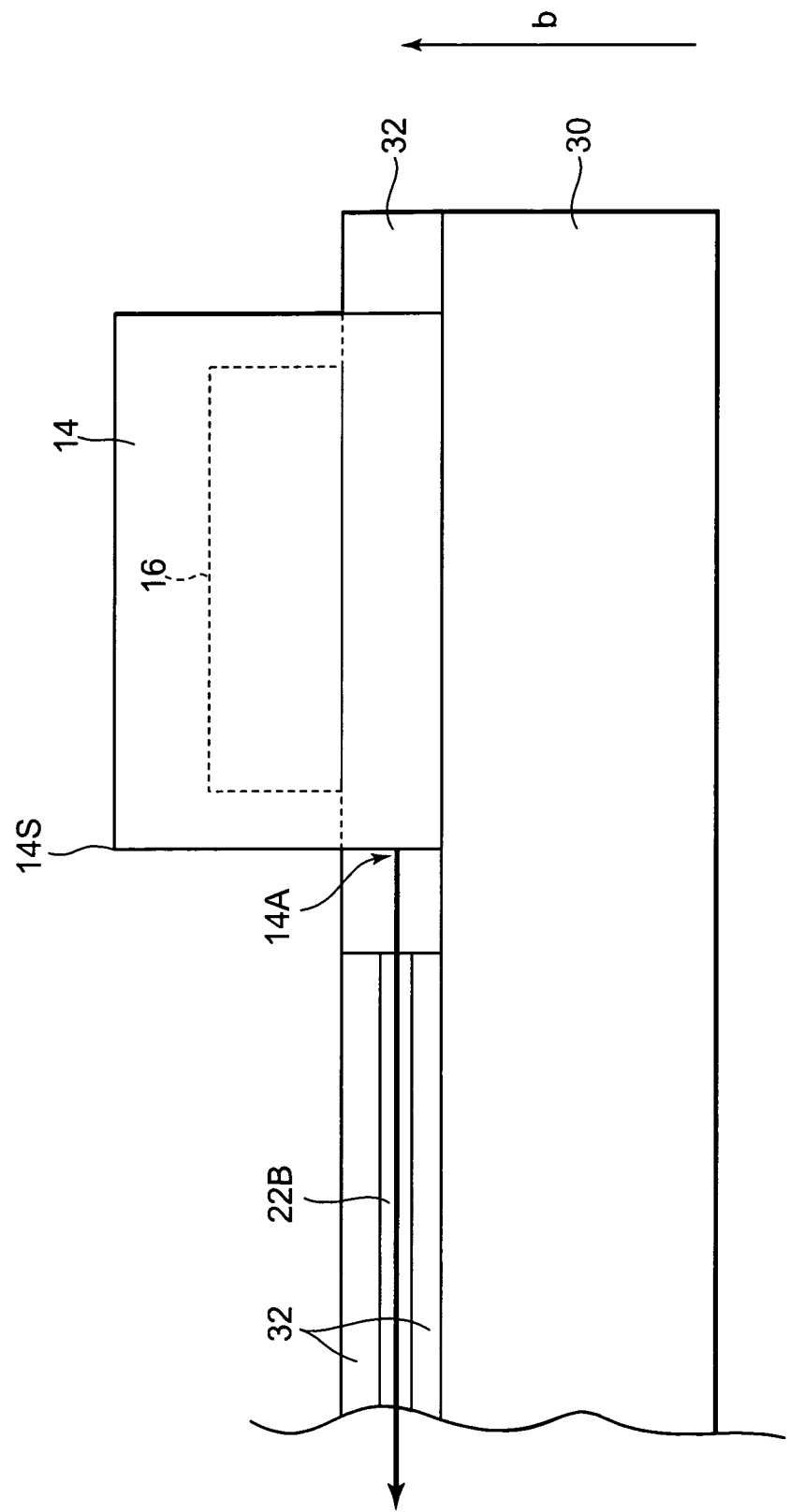

OPTICAL BIDIRECTIONAL COMMUNICATION MODULE AND OPTICAL BIDIRECTIONAL COMMUNICATION APPARATUS

CROSS-REFERENCE TO RELATED APPLICATION

This application claims priority under 35 USC 119 of prior Japanese Patent Application No. P2009-224673 filed on Sep. 29, 2009, the entire contents of which are incorporated herein by reference.

BACKGROUND OF THE INVENTION

1. Field of the Invention

This application relates to an optical bidirectional communication module that incorporates a light emitting element, a light receiving element and an optical waveguide, on a substrate. The application also relates to an optical bidirectional communication apparatus that includes the optical bidirectional communication module.

2. Description of the Related Art

An optical communication module that optically performs bidirectional communication through an optical fiber is well known. Japanese Patent Laid-Opens No. 10-206678 and No. 11-678705 disclose such optical communication modules.

The optical communication module disclosed in the publication No. 10-206678 includes a semiconductor laser module, a photodiode and a bandpass filter. The laser module and the photodiode respectively serve as a transmission unit and a reception unit of the optical communication module. The bandpass filter reflects to the photodiode light received from an optical fiber, and transmits to the optical fiber light emitted from the laser module. In this optical communication module, the laser module and the photodiode are individually packaged. This makes it difficult to downsize.

The optical communication module disclosed in the publication No. 11-678705 similarly includes a semiconductor laser element, a photodiode and a bandpass filter. In this optical communication module, the laser element, the photodiode and the bandpass filter are integrated on a planar substrate, and therefore this optical communication module can be downsized. However, the bandpass filter is adhesively mounted to a groove formed on the planer substrate by a dicing process. Therefore, the fabrication yield of this optical communication module is liable to decrease, resulting in high production costs.

SUMMARY OF THE INVENTION

An object of the application is to disclose an optical bidirectional communication module and apparatus capable of being downsized without increasing production costs. Another object of the application is to disclose an optical bidirectional communication module and apparatus capable of being produced at reduced cost.

In one aspect, an optical bidirectional communication module includes a light-emitting element, a light-receiving element, an optical waveguide and an optical substrate. The optical waveguide performs wavelength division on light received from an optical fiber and guides the received light to the light-receiving element. The optical waveguide also performs wavelength division on light emitted from the light-emitting element and guides the emitted light to the optical fiber. The optical substrate incorporates the light-emitting element, the light-receiving element and the optical waveguide thereon.

In another aspect, an optical bidirectional communication apparatus includes an optical bidirectional communication module, a drive unit and an amplifier. The optical bidirectional communication module includes a light-emitting element, a light-receiving element, an optical waveguide and an optical substrate. The optical waveguide performs wavelength division on light received from an optical fiber and guides the received light to the light-receiving element. The optical waveguide also performs wavelength division on light emitted from the light-emitting element and guides the emitted light to the optical fiber. The optical substrate incorporates the light-emitting element, the light-receiving element and the optical waveguide thereon. The drive unit drives the light-emitting element, and the amplifier amplifies an optical signal based on the light received from the optical fiber.

The full scope of applicability of the optical bidirectional communication module and apparatus will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The optical bidirectional communication module and apparatus will become more fully understood from the following detailed description with reference to the accompanying drawings, which are given by way of illustration only, and thus not to limit the invention, and wherein:

FIG. 2 is an enlarged plan view of a portion of the communication module where a light-emitting element is incorporated;

FIG. 5 is an enlarged sectional view of the portion of the communication module where the light-emitting element is incorporated;

DETAILED DESCRIPTION OF THE INVENTION

A preferred embodiment of an optical bidirectional communication module and apparatus according to the invention is described below in detail with reference to the accompanying drawings.

Figure 1:
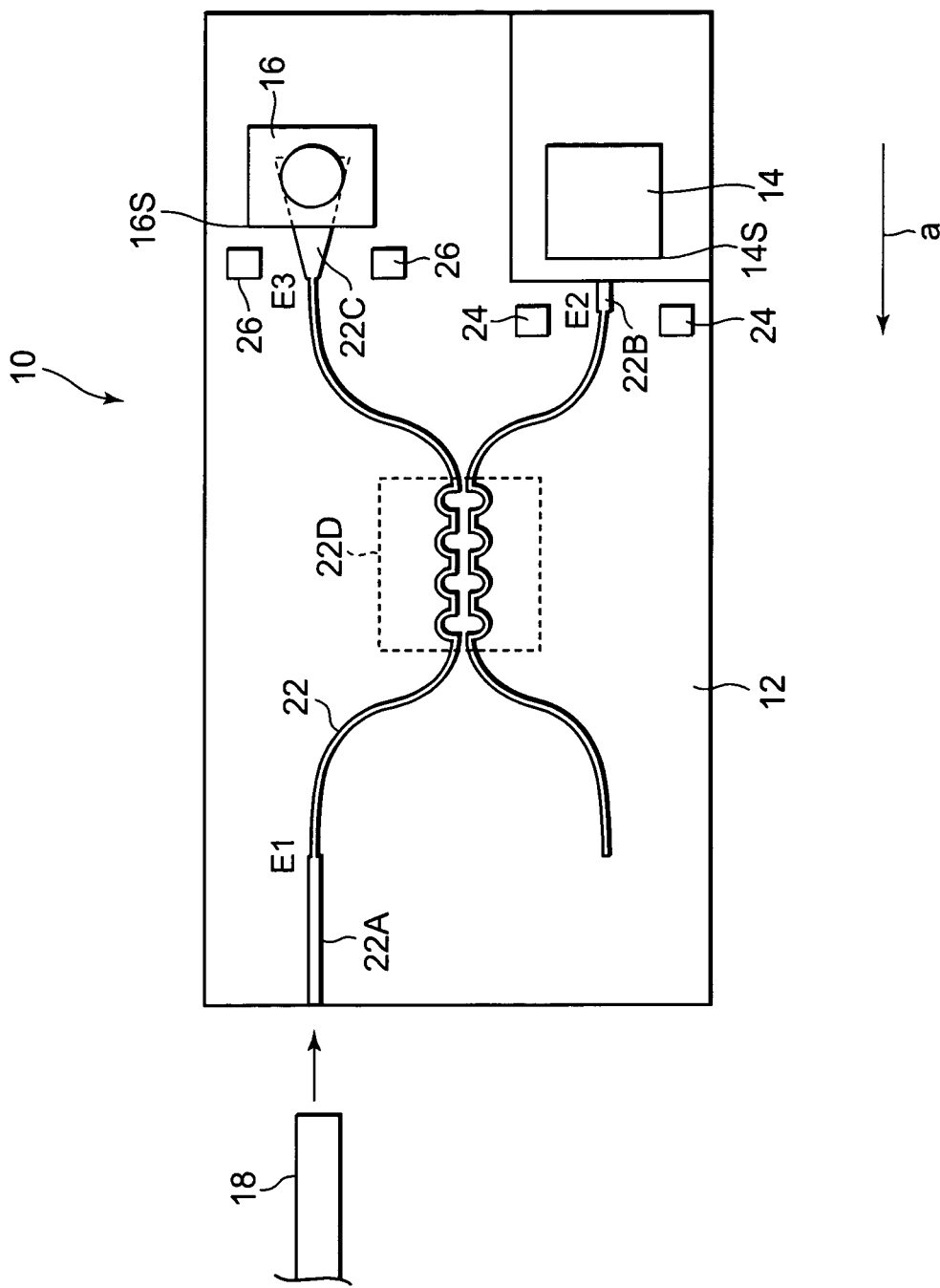
FIG. 1 is a schematic plan view of an optical bidirectional communication module according to an embodiment.

FIG. 1 is a schematic plan view of an optical bidirectional communication module 10, which includes an optical substrate 12, a light-emitting element 14, a light-receiving element 16, an optical waveguide 22, first alignment marks 24 and second alignment marks 26. An optical fiber 18 is connected to the communication module 10.

The light-emitting element 14 and the light-receiving element 16 are incorporated on the optical substrate 12. The waveguide 22 is made of silicon (Si) and formed on the optical substrate 12 by conventional semiconductor processes. The waveguide 22 and the optical fiber 18 are optically connected to each other.

As shown in FIG. 1, an input-output port 22A is provided at an end portion E1 of the waveguide 22, close to the optical fiber 18. The width of the input-output port 22A is greater than that of the waveguide 22.

FIG. 2 is an enlarged plan view of a portion of the communication module 10 where the light-emitting element 14 is incorporated. As shown in FIG. 2, an input port 22B is provided at an end portion E2 of the waveguide 22, close to the light-emitting element 14. The width of the input port 22B is greater than that of the waveguide 22.

Figure 3A:
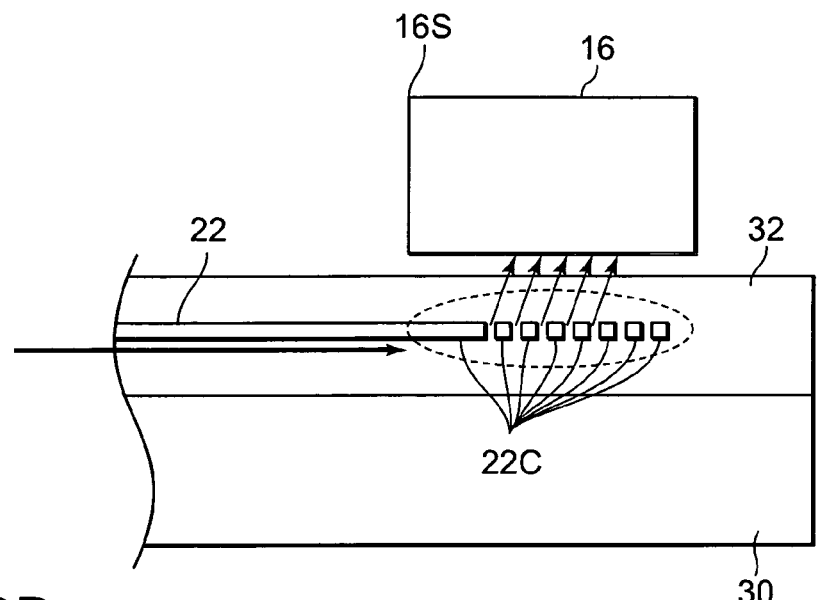
FIG. 3A is a first enlarged sectional view of a portion of the communication module where the light-receiving element is incorporated.
Figure 3B:
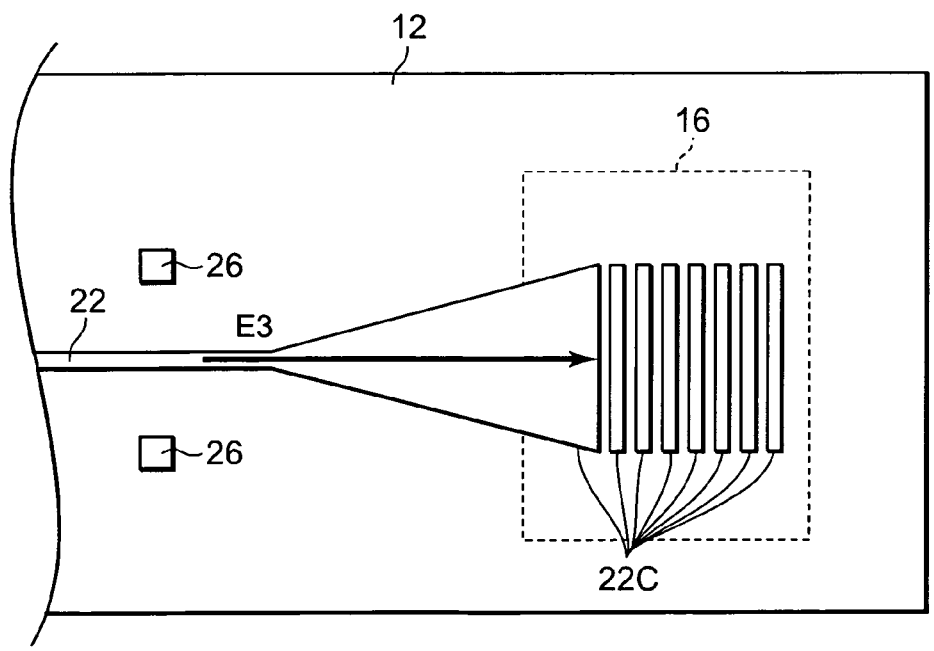
FIG. 3B is a first enlarged plan view of the portion of the communication module where the light-receiving element is incorporated.
Figure 4A:
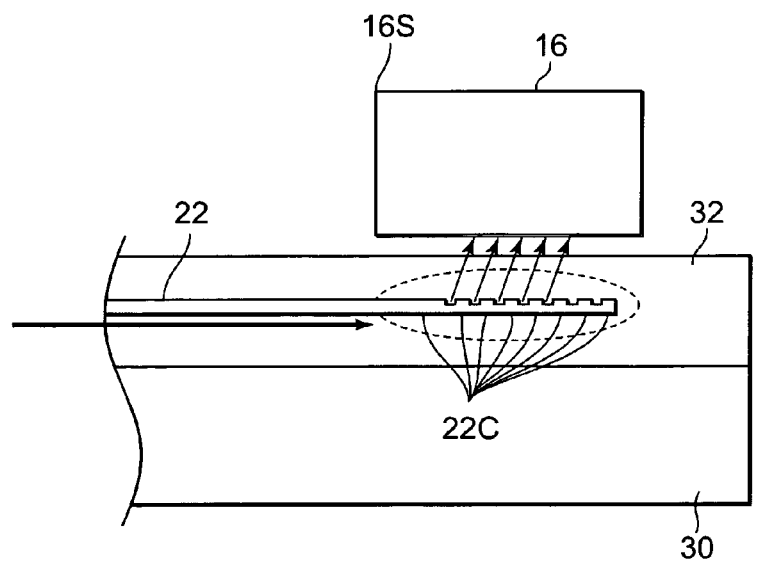
FIG. 4A is a second enlarged sectional view of the portion of the communication module where the light-receiving element is incorporated.
Figure 4B:
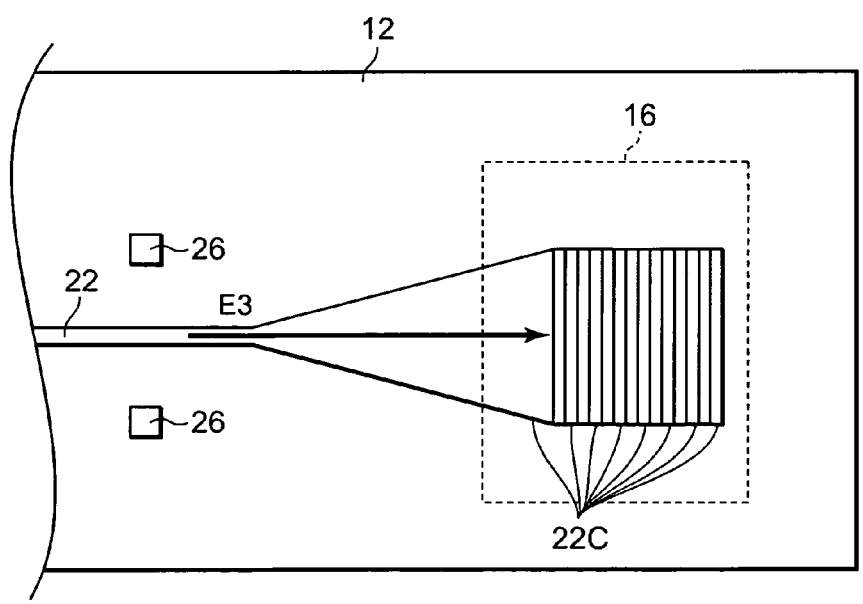
FIG. 4B is a second enlarged plan view of the portion of the communication module where the light-receiving element is incorporated.

FIGS. 3A and 3B are respectively a first enlarged sectional view and a first enlarged plan view of a portion of the communication module 10 where the light-receiving element 16 is incorporated. FIGS. 4A and 4B are respectively a second enlarged sectional view and a second enlarged plan view of the portion of the communication module 10 where the light-receiving element 16 is incorporated.

As shown in FIGS. 3A and 3B, an output port 22C is provided at an end portion E3 of the waveguide 22, close to the light-receiving element 16. The output port 22C has a configuration of a grating. The output port 22C gradually broadens from the end portion E3 toward the light-receiving element 16. Multiple separated lines made of silicon are arranged at predetermined intervals at an end portion of the output port 22C so that those lines function as the grating. The grating may be configured by arranging separated arcuate lines made of silicon at predetermined intervals. As shown in FIGS. 4A and 4B, the grating also may be configured by forming the end portion of the output port 22C into a comb-like shape where the multiple lines are joined together at their bottom ends.

Referring back to FIG. 1, the waveguide 22 guides light emitted from the light-emitting element 14 to the input-output port 22A, and guides light input to the input-output port 22A from the optical fiber 18 to the light-receiving element 16. A middle portion of the waveguide 22 has a configuration of a wavelength division filter 22D. The wavelength division filter 22D performs wavelength division on the light emitted from the light-emitting element 14 and guides the emitted light to the input-output port 22A. In addition, the wavelength division filter 22D performs wavelength division on the light input to the input-output port 22A from the optical fiber 18 and guides the input light to the light-receiving element 16. In this embodiment, a four-stage Mach-Zehnder interferometer is taken as an example of the wavelength division filter 22D. However, the wavelength division filter 22D may be a Y-branch waveguide or an AWG (Arrayed Waveguide Grating) multi/demultiplexer.

As shown in FIG. 1, the first alignment marks 24, which are square in shape, are formed on the optical substrate 12 in the vicinity of a location where the light-emitting element 14 is mounted. The first alignment marks 24 are used for alignment of the light-emitting element 14 to the optical substrate 12 when the light-emitting element 14 is mounted to the surface of the optical substrate 12. Similarly, the second alignment marks 26, which also are square in shape, are formed on the optical substrate 12 in the vicinity of a location where the light-receiving element 16 is mounted. The second alignment marks 26 are used for alignment of the light-receiving element 16 to the optical substrate 12 when the light-receiving element 16 is mounted to the surface of the optical substrate 12. The number of first alignment marks 24 and the number of second alignment marks 26 are not limited to two. In addition, their shapes are not limited to square.

FIG. 5 is an enlarged sectional view of the portion of the communication module 10 where the light-emitting element 14 is incorporated. As shown in FIGS. 1 and 5, a predetermined portion at the bottom-right corner of the optical substrate 12, to which the light-emitting element 14 is mounted, is partially removed. In this embodiment, the light-emitting element 14 is an edge-emitting semiconductor laser element, and is mounted to the optical substrate 12 so that a light-emitting section 14A of the light-emitting element 14 and the input port 22B are optically connected to each other.

As shown in FIG. 5, the light-emitting section 14A and the light-receiving element 16 are nonoverlapping in the thickness direction b of the optical substrate 12. This prevents the light-receiving element 16 from receiving any light that has escaped from the light-emitting element 14.

In addition, referring back to FIG. 1, a light-emitting surface 14S of the light-emitting element 14 and a light-receiving surface 16S of the light-receiving element 16 are nonoverlapping in the travelling direction a of the light emitted from the light-emitting element 14. This more effectively prevents the light-receiving element 16 from receiving the escaped light from the light-emitting element 14.

Next, a method of making the communication module 10 will be described.

The optical substrate 12 is composed of an SOI (Silicon On Insulator) substrate, in which a silicon dioxide ($SiO_2$) film is sandwiched between two silicon (Si) films. The waveguide 22, the first alignment marks 24 and the second alignment marks 26, all made of silicon, are formed on the optical substrate 12 by conventional semiconductor processes.

During manufacture, first, a photoresist is applied to a surface of the SOI substrate that is to be the optical substrate 12. Next, part of the surface of the SOI substrate with the photoresist where the waveguide 22, the first alignment marks 24 and the second alignment marks 26 are supposed to be formed, is selectively exposed to light through a photomask. Next, a photoresist that has not been exposed to light is removed from the surface of the SOI substrate, thereby forming photoresist patterns corresponding to the waveguide 22, the first alignment marks 24 and the second alignment marks 26. Next, an upper silicon film of the SOI substrate is selectively removed by etching while using the photoresist patterns as an etching mask, and then, a photoresist remaining on the surface of the optical substrate 12 is removed.

At this point, the waveguide 22, the first alignment marks 24 and the second alignment marks 26 are formed on the SOI substrate. Then, a silicon dioxide film is formed over the SOI substrate, the waveguide 22, the first alignment marks 24 and the second alignment marks 26. Finally, the silicon dioxide film at the bottom-right corner of the SOI substrate, to which the light-emitting element 14 is mounted, is removed by etching a predetermined amount, e.g., 4 μm, in the thickness direction b of the optical substrate 12. In this manner, the communication module 10 is made.

Since the silicon dioxide film formed on the optical substrate 12 is transparent, the first alignment marks 24 and the second alignment marks 26 can be detected through the silicon dioxide film.

Referring back to FIGS. 3A and 5, the waveguide 22 made of silicon is formed over a lower silicon film 30 of the SOI substrate so that the waveguide 22 is encompassed by a silicon dioxide film 32. Since silicon and silicon dioxide have different refractive indices, the light emitted from the light-emitting element 14 and the light input to the input-output port 22A from the optical fiber 18 travel in the waveguide 22.

Next, a modification of the communication module 10 will be described.

As is well known, the refractive index of silicon is about 3.54, whereas the refractive index of silicon dioxide is about 1.47. That is, the difference in refractive index as between silicon and air is greater than that between silicon dioxide and air. Therefore, it is possible that a large loss of light may occur when the light is input to the optical waveguide 22 from the outside thereof.

Figure 6:
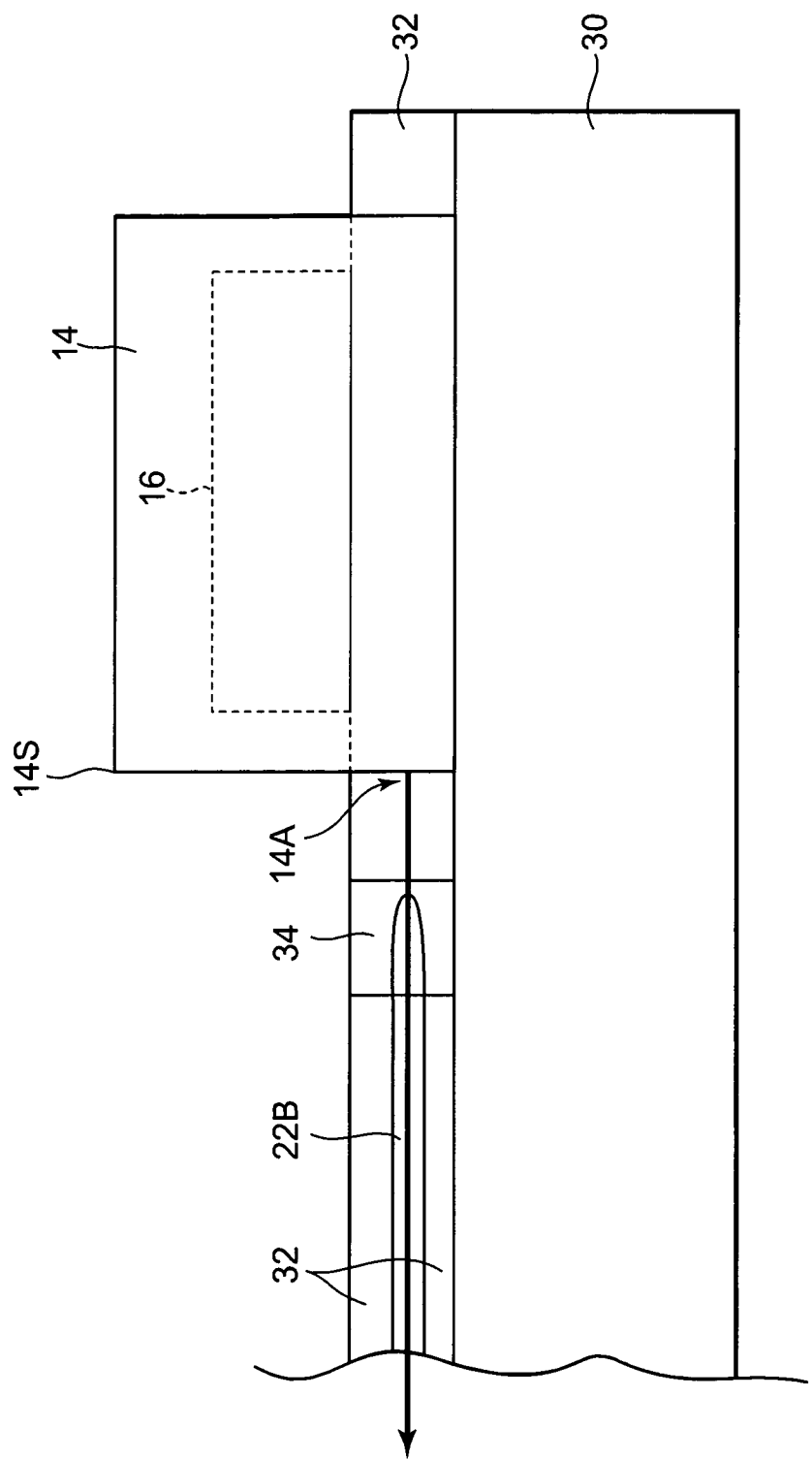
FIG. 6 is an enlarged sectional view of the portion of a modified embodiment of the communication module where the light-emitting element incorporated.

FIG. 6 is an enlarged sectional view of the portion of the communication module 10 where the light-emitting element 14 is incorporated, according to a modification. As shown in FIG. 6, a needle-shaped end portion of the input port 22B made of silicon is encompassed in a silicon nitride film (SiN) 34 whose refractive index is about 2.0. That is, the input port 22B has a dual core configuration. Therefore, the refractive index of the input port 22B gradually decreases toward its exterior, thereby reducing the loss of light. Similarly to the input port 22B, the input-output port 22A also may have a dual core configuration.

Next, an optical bidirectional communication apparatus 40 that includes the communication module 10 (of either the first described or modified form) will be described with reference to FIG. 7.

Figure 7:
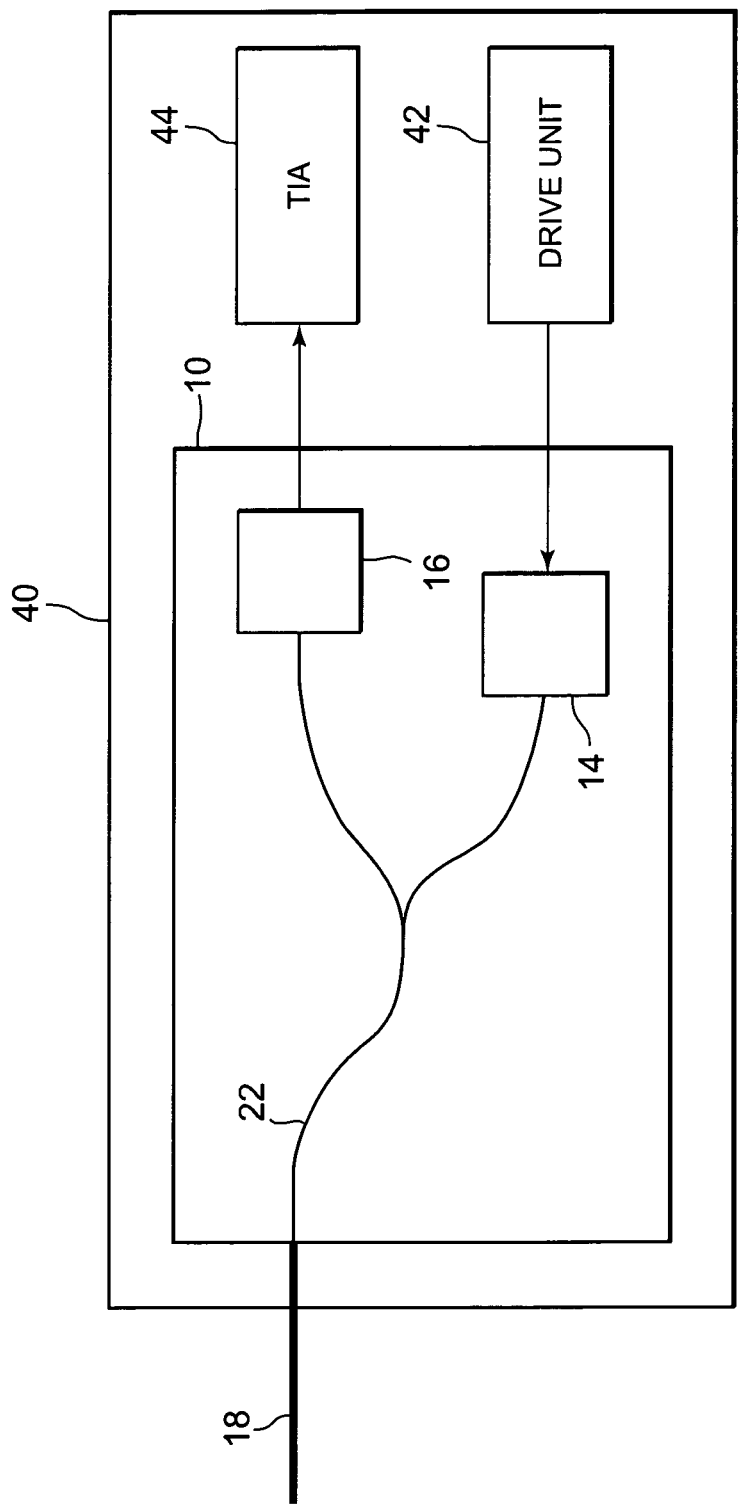
FIG. 7 is a schematic plan view of an optical bidirectional communication apparatus according to the embodiment.

FIG. 7 is a schematic plan view of the communication apparatus 40 according to the embodiment, which includes the communication module 10, a drive unit 42 and a TIA (Transimpedance Amplifier) 44. The drive unit 42 drives the light-emitting element 14 of the communication module 10. The TIA 44 as an amplifier amplifies an optical signal that is based on the light received by the light-receiving element 16 of the communication module 10. The communication apparatus 40 may be used in any equipment that performs optical bidirectional communication, such as network communication equipment.

As described above, in the communication module 10 of this embodiment, the waveguide 22, which includes the wavelength division filter 22D and is made of silicon, the light-emitting element 14 and the light-receiving element 16 are integrated on the optical substrate 12. Therefore, the communication module 10 is capable of being downsized.

In addition, the waveguide 22 is formed by conventional semiconductor processes, so the fabrication yield should not decrease and production costs should not increase. Moreover, the light-emitting element 14 and the light-receiving element 16 are mounted to the surface of the optical substrate 12 with high accuracy by using the alignment marks 24 and 26. This simplifies or omits optical alignment of an optical system that consists of the waveguide 22, the light-emitting element 14 and the light-receiving element 16, thereby reducing the production costs.

The optical bidirectional communication module and apparatus being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. An optical bidirectional communication module comprising:
    a light-emitting element;
    a light-receiving element;
    an optical waveguide that includes an input port optically connected to the light-emitting element, and an output port that includes a grating at an end portion close to the light-receiving element, that performs wavelength division on light received from an optical fiber and guides the received light to the light-receiving element, and that performs wavelength division on light emitted from the light-emitting element and guides the emitted light to the optical fiber; and
    an optical substrate that incorporates the light-emitting element, the light-receiving element and the optical waveguide thereon, wherein
    the light-receiving element is arranged above the output port so that an underface of the light-receiving element receives light output from the output port, and
    a first face of the optical substrate, on which the light-emitting element is mounted, and a second face of the optical substrate, on which the light-receiving element is mounted, are in respective planes that are nonoverlapping in a thickness direction of the optical substrate.

2. The optical bidirectional communication module according to claim 1, wherein the optical waveguide is made of silicon.

3. The optical bidirectional communication module according to claim 1, wherein a light-emitting surface of the light-emitting element and a light-receiving surface of the light-receiving element are in respective planes that are non-overlapping in a travelling direction of the light emitted from the light-emitting element.

4. The optical bidirectional communication module according to claim 1, wherein the first face of the optical substrate is obtained by etching a predetermined portion of an optical substrate member of uniform thickness.

5. The optical bidirectional communication module according to claim 1, wherein a middle portion of the optical waveguide has a configuration defining a wavelength division filter.

6. The optical bidirectional communication module according to claim 1, wherein the light-emitting element is an edge-emitting semiconductor laser element.

7. The optical bidirectional communication module according to claim 1, further comprising:
    a first alignment mark for alignment of the light-emitting element to the optical substrate when the light-emitting element is mounted to the optical substrate; and
    a second alignment mark for alignment of the light-receiving element to the optical substrate when the light-receiving element is mounted to the optical substrate.

8. The optical bidirectional communication module according to claim 7, wherein the first alignment mark and the second alignment mark are made of the same materials.

9. The optical bidirectional communication module according to claim 8, wherein the first alignment mark and the second alignment mark are made of silicon.

10. An optical bidirectional communication apparatus comprising:
    an optical bidirectional communication module that includes
        a light-emitting element,
        a light-receiving element,
        an optical waveguide that includes an input port optically connected to the light-emitting element, and an output port that includes a grating at an end portion close to the light-receiving element, that performs wavelength division on light received from an optical fiber and guides the received light to the light-receiving element, and that performs wavelength division on light emitted from the light-emitting element and guides the emitted light to the optical fiber, and an optical substrate that incorporates the light-emitting element, the light-receiving element and the optical waveguide thereon;

a drive unit that drives the light-emitting element; and an amplifier that amplifies an optical signal based on said received light, wherein the light-receiving element is arranged above the output port so that an underface of the light-receiving element receives light output from the output port, and a first face of the optical substrate, on which the light-emitting element is mounted, and a second face of the optical substrate, on which the light-receiving element is mounted, are in respective planes that are nonoverlapping in a thickness direction of the optical substrate.

* * * * *